United States Patent [19]
Davidson et al.

[11] 3,725,914
[45] Apr. 3, 1973

[54] MEASUREMENT OF TEMPERATURE INVERSIONS

[75] Inventors: Cliff I. Davidson; Charles F. Laing, both of Pittsburgh, Pa.

[73] Assignee: Westinghouse Electric Corporation, Pittsburgh, Pa.

[22] Filed: May 5, 1971

[21] Appl. No.: 140,539

[52] U.S. Cl. .................................................343/5 W
[51] Int. Cl. .................................................G01s 9/60
[58] Field of Search ............................343/5 R, 5 W

[56] References Cited

UNITED STATES PATENTS 3,251,057 5/1966 Buehler et al..........................343/5 W
3,448,613 6/1969 Kastner et al........................343/5 W

*Primary Examiner*—T. H. Tubbesing
*Attorney*—F. H. Henson, E. P. Klipfel and J. L. Wiegreffe

[57] ABSTRACT

Method and apparatus for measuring the height and strength of the uppermost limit of a temperature inversion with the use of radio-frequency wave energy. This is achieved by using a wavelength which will not be reflected by water droplets and particulate matter in the air but which will be at least partially reflected at the top of an inversion layer due to a change in the index of refraction of the air because of an abrupt change in temperature and density. Preferably, separated transmitting and receiving antennas are used and the height of the uppermost limit of the inversion layer is determined trigometrically.

12 Claims, 9 Drawing Figures

MEASUREMENT OF TEMPERATURE INVERSIONS

BACKGROUND OF THE INVENTION

As is known, atmospheric temperature inversions are characterized by a layer of warm air above the surface of the earth with an underlying cooler layer beneath it. The warmer air above prevents the lower air mass adjacent the earth's surface from rising, resulting in stagnation and pollution. The height of the interface between the cooler and hotter air masses is a measure of the volume of cooler air beneath; and this, in turn, is a measure of the degree of contamination which might result adjacent the earth's surface. Furthermore, as the height of the uppermost limit of the inversion increases, it is an indication that the inversion condition is abating.

Presently, weather bureaus measure the height of the interface between the cooler and warmer air masses by sending a sounding balloon aloft to measure temperature at various heights above ground. Such a procedure, however, is costly since both the equipment required and the operation involved are expensive.

SUMMARY OF THE INVENTION

In accordance with the present invention, a method and apparatus are provided for measuring the uppermost limit of an inversion layer by utilizing microwave energy reflection techniques which require the use of ground equipment only. Specifically, the invention requires only radar transmitting and receiving antennas and their associated transmitting and receiving equipment, together with a chart recorder or other similar device. Once the equipment is installed, the cost of operating it is incidental; and it enables a more or less constant monitoring of the height of the inversion layer.

The invention resides in the principle of microwave energy reflection at a change of index of refraction. In the case of a temperature inversion, the gradient of the index of refraction changes at the top of the inversion layer due to the change in air density which is, in turn, caused by the differential air temperature above and below the inversion layer. The change in the index of refraction causes a microwave signal transmitted from a radar antenna to reflect back to a receiving antenna on the ground. Some of the radiofrequency wave energy is refracted through the interface between the cooler and hotter air masses; while at least a small amount is reflected back and detected. The amount of energy reflected depends upon the sharpness of the boundary condition marking the top of the inversion. Any temperature inversion will result in a boundary condition sufficient to reflect back at least a portion of the wave energy which can be detected.

The frequency of the microwave energy utilized should be in the range of about 2,000 to 3,000 megahertz and preferably 2,300 megahertz. At this frequency, the wavelength (13 centimeters) is large compared to water droplets and particulate matter in the air. As a result, there is almost no interference or "scatter." The detection apparatus can be used at any time of the day or night, and even during rain or snow.

Since the angle of incidence of the microwave energy with respect to the inversion layer will be equal to the angle of reflection, both the transmitting and receiving antennas must be at the same angle with respect to horizontal in order for the receiving antenna to detect the reflected wave energy, which is preferably in the form of a thin pencil beam. Furthermore, as the height of the inversion layer rises or lowers, the angles of the antennas for reception of the reflected wave energy will vary. Therefore, in determining the height of an inversion layer, the angle of the transmitting antenna is moved in increments, such as 5°, with respect to horizontal. Each time it is moved through an increment, the receiving antenna is swept through a 90° arc. As the receiving antenna sweeps through its arc, and assuming that the transmitting antenna is at the correct angle to facilitate reflection of the wave energy to the receiving antenna, the existence of the inversion layer will be indicated by pulses or "blips" in the received wave energy as recorded on a chart recorder, or the like. By comparing these returns (i.e., those returns derived when a temperature inversion occurs) with standard or "zero" returns derived when no inversion exists, the angles of the two antennas for reflection of the beam to the receiving antenna can be derived. From this information, and the known spacing between the antennas on the ground, the height of the inversion layer can then be calculated from trignometric considerations.

The above and other objects and features of the invention will become apparent from the following detailed description taken in connection with the accompanying drawings which form a part of this specification, and in which.

Figure 1:
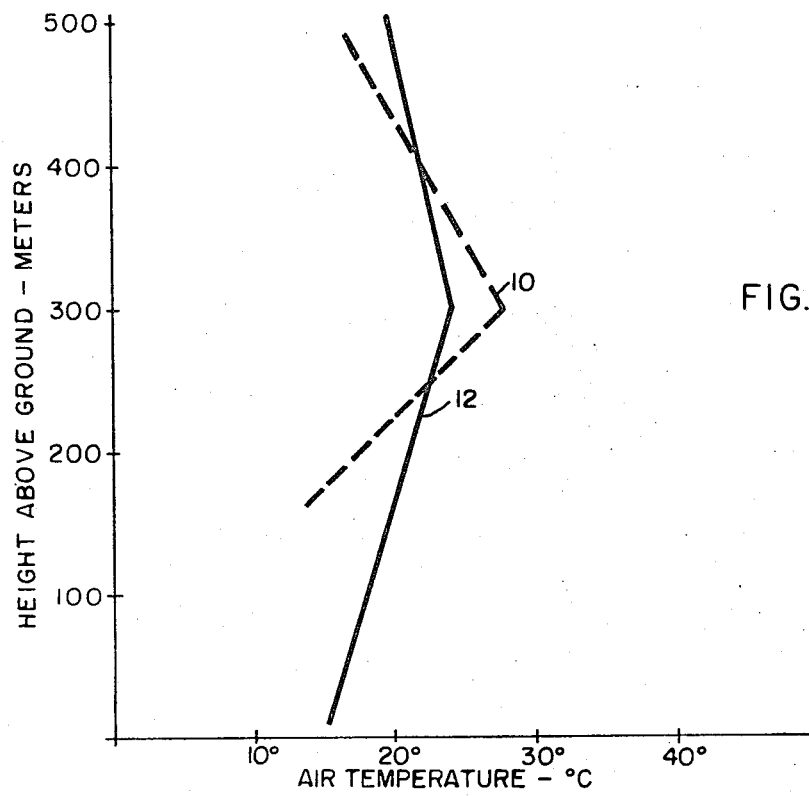
FIG. 1 is a plot of air temperature versus height above ground showing the abrupt change in temperature at the uppermost limit of an inversion layer.

With reference now to the drawings, and particularly to FIG. 1, air temperature versus height above ground is shown for the case where a temperature inversion exists. At the lower elevations, below 300 meters, the temperature may range from 12° to 13°C on the surface to 20° – 30°C at the inversion boundary. At 300 meters, the gradient of the temperature changes abruptly, so that there is approximately 5° or 10°C decrease in temperature per hectometer of elevation above the earth's surface. When a condition of this sort occurs, the air around 300 meters is, of course, warmer than that below. This prevents the cooler, lower air from rising and results in stagnation and pollution. A so-called heavy inversion exists when the temperature changes abruptly at, for example, 300 meters as illustrated by the broken line 10. A less severe temperature inversion is illustrated by the solid line 12. As will be seen, the invention resides in the fact that due to a change in the index of refraction between the cooler, lower air and the upper, hotter air, a microwave signal can be made to reflect from the upper limit of the inversion layer, enabling its distance above ground to be determined.

Figure 2:
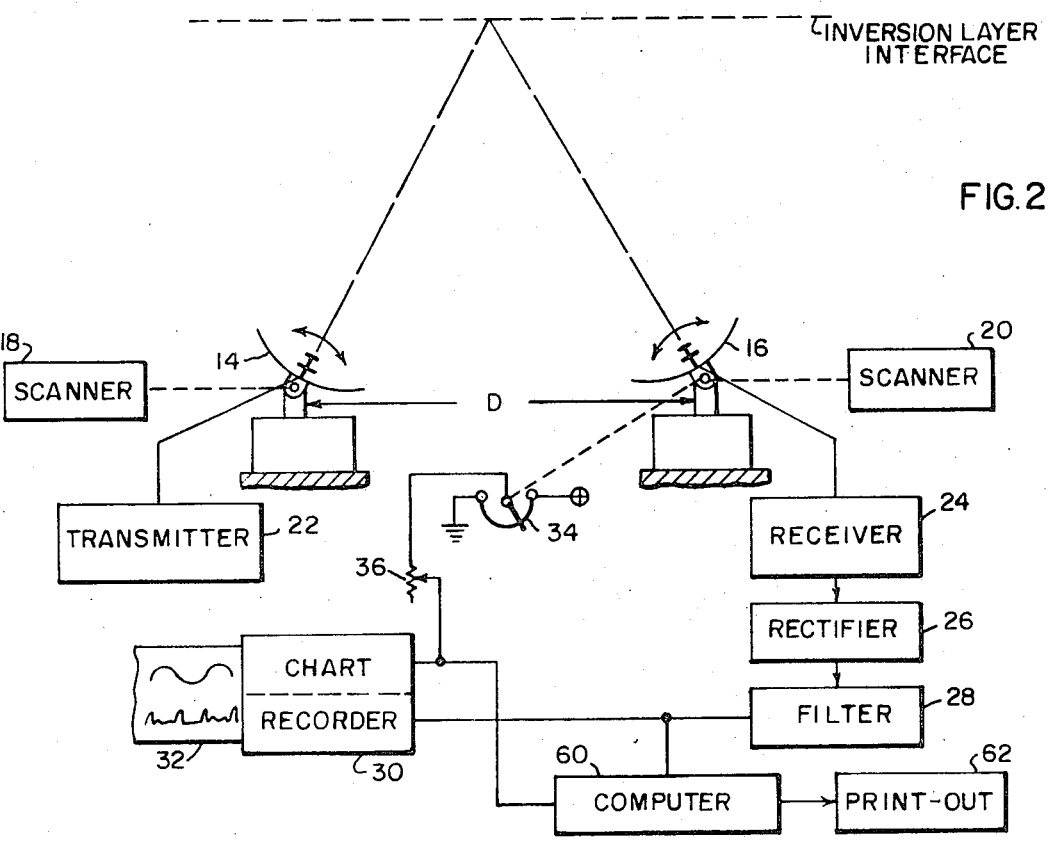
FIG. 2 is a schematic diagram of the measuring apparatus of the invention.

The apparatus of the invention is shown in FIG. 2 and includes a transmitting antenna 14 and a receiving antenna 16 which are preferably at the same height above sea level and spaced apart by a known distance. Each of the antennas is adapted to scan through a 90° arc, at one end of which the antenna 14, for example, faces antenna 16 and at the other end of which the main beam from the antenna is directed vertically upwardly. In this respect, each of the antennas 14 and 16 is provided with suitable scanners 18 and 20, respectively. Connected to the transmitting antenna 14 is a transmitter 22 which will generate wave energy at a frequency in the range of about 2,000 to 3,000 megahertz and preferably 2,300 megahertz. As was explained above, the wavelength at this frequency is about 13 centimeters which is large compared to water droplets, clouds and other particulate matter in the air, with the result that there is no interference or scatter due to the particulate matter.

The receiving antenna 16 is connected to a receiver 24, the output of the receiver 24 being applied to rectifier 26 and filter 28 to one channel of a chart recorder 30. The recording medium 32 shown in FIG. 2 for chart recorder 30 moves from left to right, for example, while a pen records on the medium 32 the magnitude of the received signal at right angles to the direction of movement of the medium.

Connected to the antenna 16 is a rheostat 34, energized from a suitable source of d.c. potential, connected through an adjusting pot 36 to the other channel of the chart recorder 30. As the antenna 16 scans back and forth through a 90° arc, the signal of the movable tap of the rheostat 34 will comprise a generally sinusoidal signal which is recorded above the recording showing the magnitude of the received signal.

Figure 3:
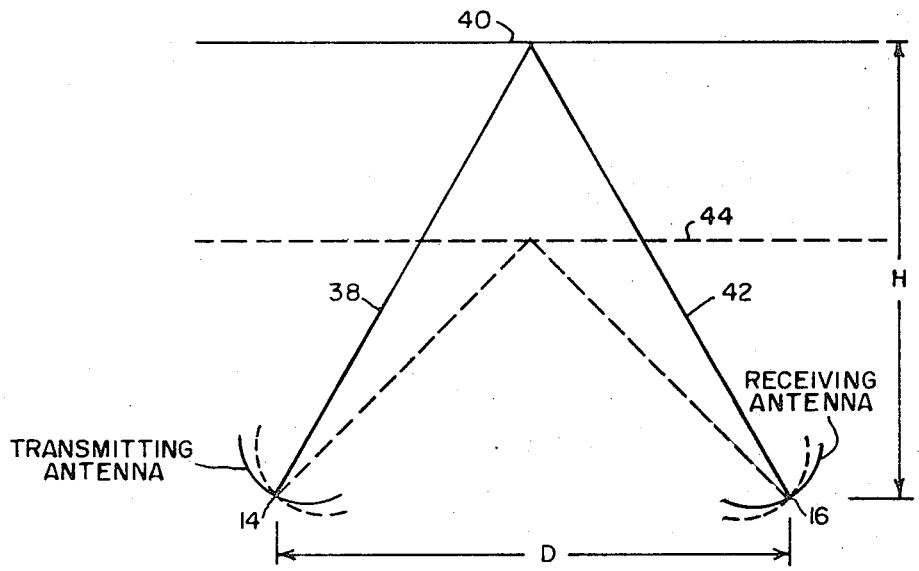
FIGS. 3 and 4 are schematic diagrams illustrating the operation of the invention.

With reference now to FIG. 3, it can be seen that as a beam of radiation 38 from the transmitting antenna 14 travels upwardly, it can intersect an inversion layer 40. Part of the transmitted energy will be refracted and pass through the inversion layer and the remainder will be reflected along path 42. Since the angle of incidence will be equal to the angle of reflection, it will be appreciated that the two antennas 14 and 16 must be at the same angular relationship with respect to horizontal in order for the reflected beam 42 to be received by the receiving antenna 16. Once the transmitting and receiving antennas 14 and 16 are in the correct angular positions in order that the transmitted beam will be reflected from the inversion layer 40 and received by the receiving antenna 16, the height, H, of the inversion layer can be calculated from the known angular orientation of antennas 14 and 16 and the known distance, D, between the two antennas. It will be appreciated, however, that as the height of the inversion layer varies, so also will the angles of antennas 14 and 16 at which the transmitted beam is reflected to antenna 16. This, for example, is illustrated by the broken line 44 representing a lower inversion layer height and the positions of the antennas 14 and 16 shown in broken lines in FIG. 3.

Figure 4:
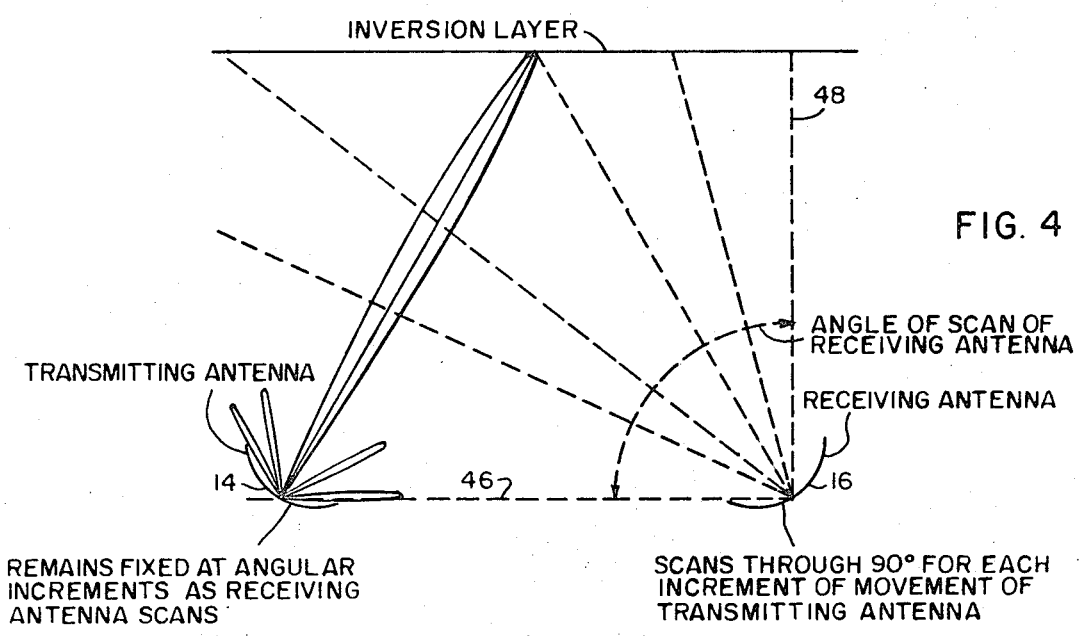
Figure 5A:
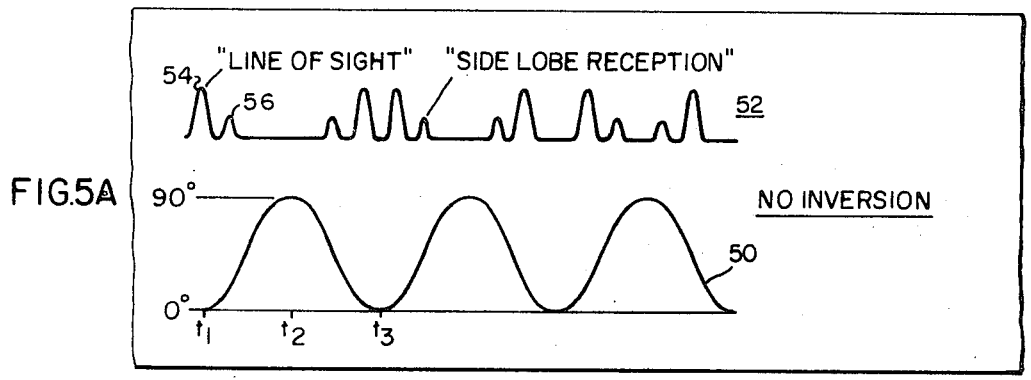
FIGS. 5A and 5B illustrate the recordings on the chart recorder of FIG. 2 for the case where no inversion exists (FIG. 5A) and the case where an inversion does exist (FIG. 5B)

The initial step in determining the height of the inversion layer is to obtain a "zero" or standard level for received signal strength when there is no inversion. This is accomplished during a time of no inversion by setting the transmitting antenna angle at several points from 0° to 90°, for example, at 5° increments. For each angle, the receiving antenna is scanned a full 90°, from horizontal (i.e., line of sight transmission) to vertical. This is illustrated in FIG. 4. The transmitting antenna 14 may, for example, be at an angle of 45° with respect to horizontal. While it remains in this position, the receiving antenna 16 is scanned through 90° starting from a horizontal line of sight position indicated by the broken line 46 to a vertical position indicated by the broken line 48. The recordings on the recording medium 32 of FIG. 2 which result in this process are shown in FIG. 5A. Thus, the lower recording comprises a sine wave 50 produced by the signal from the rheostat 34. At time $t_1$, the antenna line of sight is horizontal; and between times $t_1$ and $t_2$, the antenna is scanning in a clockwise direction as viewed in FIG. 4 up to 90° where its radiated beam is vertical. Thereafter, the direction of rotation of the receiving antenna is reversed between times $t_2$ and $t_3$. At time $t_3$, the scanning cycle is repeated. During each back and forth scan of the receiving antenna 16, a waveform illustrated by the trace 52 in FIG. 5A is produced. The pulses or blips 54 and 56 result due to the side lobes from the transmitting antenna 14; however since there is no inversion layer under the conditions assumed, no energy is reflected from the main beam of the transmitting antenna to the receiving antenna.

The process shown in FIG. 4 is repeated for each transmitting antenna angle (e.g., 5° increments). The recordings thus obtained serve as standard or "zero" levels.

To determine the height of the uppermost limit of an inversion layer, it is necessary to repeat the above procedure of transmitter angle steps, each followed by a receiver elevation scan. This is necessary, as shown in FIG. 3, since both the transmitting and receiving antennas must be at the correct angle in order for the transmitted beam to be reflected back to the receiving antenna. Hence, a stationary angular position of the transmitting antenna will not be feasible unless the receiving antenna is moved along the ground surface at the same distance above sea level as the transmitting antenna 14 and scanned at different distances from the transmitting antenna. This latter possibility, however, would normally be considered to be impractical.

Figure 5B:
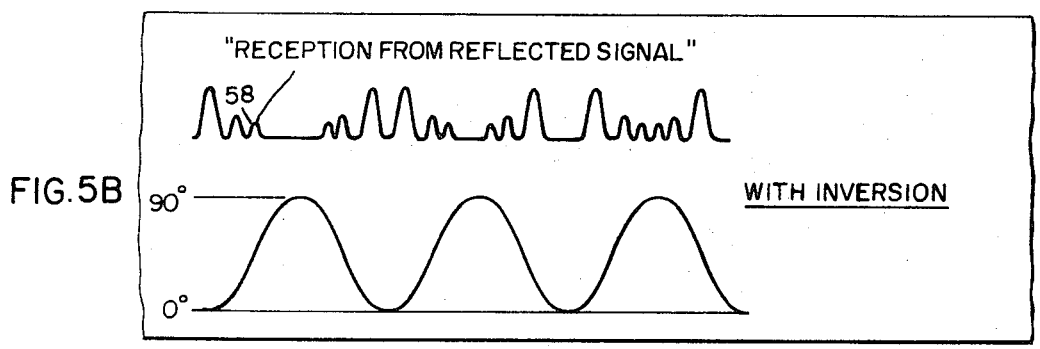

The chart recorder output obtained from this latter test (FIG. 5B) is compared to the zero level output obtained in the former test (FIG. 5A). If an inversion is present, there will be peaks 58 of received signal strength in the return waveform of FIG. 5B not present in FIG. 5A. It is then necessary to read the transmitter and receiver angles of these peaks from the chart recorder outputs. This will geometrically yield inversion layer height, since both the distance along ground and the angle are known.

The procedure for determining the inversion height is simplified somewhat by the fact that the angle of incidence always equals the angle of refraction. Thus, the transmitter and receiver angles will always be the same at an inversion reflection. The receiver elevation scan is necessary only in the vicinity of the transmitter antenna angle. However, it is usually advisable to include the entire 90° scan since any undesirable effects of miscellaneous scattering will not be concealed in this way. The chart recorder output can also be used to determine the relative strength of the inversion limit (i.e., the sharpness of the temperature gradient shown in FIG. 1). This is accomplished by comparing inversion reflection peaks at various times of the day. The higher reflection peaks will mean better boundary definitions, since more of the signal is reflected rather than refracted into upper atmosphere. The invention can also be used to indicate the rising of the mixing depths within the inversion layer. The warming of the air by the sun near the surface will cause a change in the index of refraction in the mixing area. Data thus obtained will help predict temperature inversion breakup.

Figure 6A:
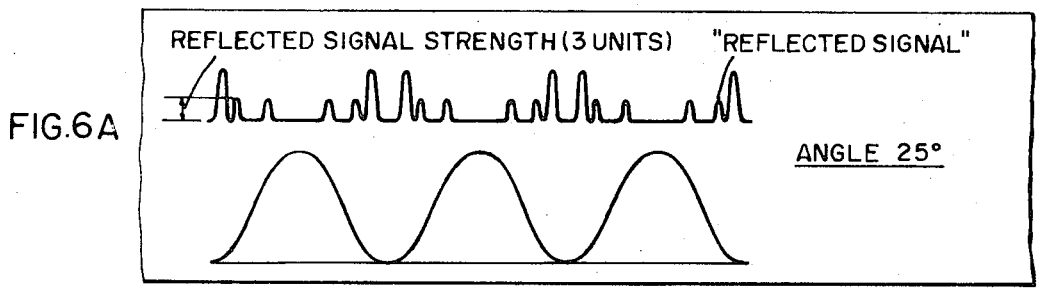
FIGS. 6A–6C comprise chart recorder recordings illustrating the manner in which the height of an inversion layer can be determined.
Figure 6B:
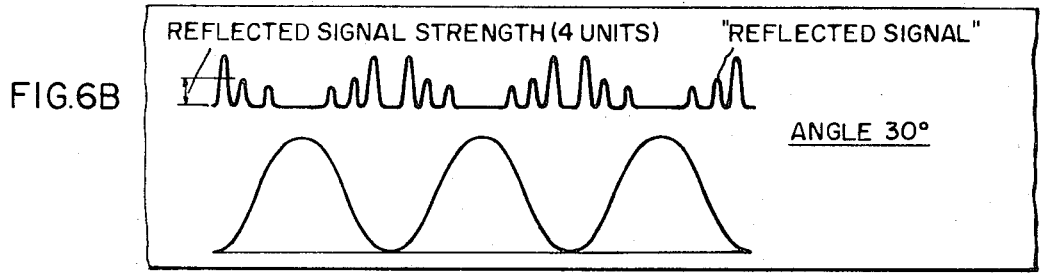
Figure 6C:
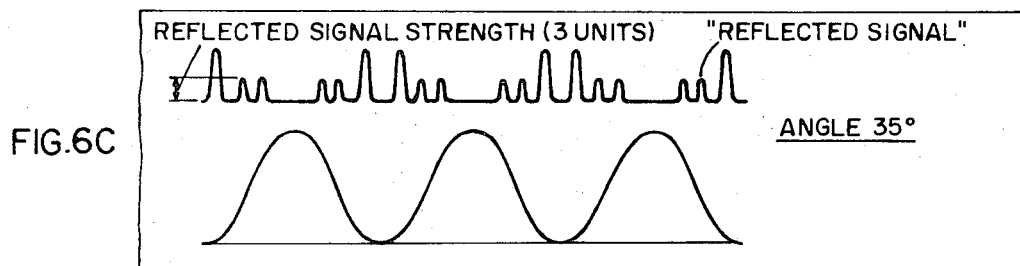

A sample calculation to determine the heights of an inversion layer is illustrated by the waveforms of FIGS. 6A–6C, assuming a transmitter-to-receiver line of sight distance of exactly 600 meters. The comparison of chart recorder outputs reveals distance peaks for transmitter antenna angles of 25°, 30° and 35° in FIGS. 6A–6C at the same receiver antenna angles. Suppose, furthermore, that the relative height of the signal strength peaks on the chart recorder output above the zero level is 3 units at 25°, 4 units at 30°, and 3 units at 35°. Since the peak signal is observed at 30°, this can be assumed to be the angle where radiated power is most completely being reflected from the inversion layer. Thus, for an angle of 30° and a distance to the reflection point of one-half the distance between the antennas or 300 meters, the height of the inversion layer is 300 tan 30°, which is approximately equal to 173 meters. If more accurate information is desired, it is necessary only to make the transmitting antenna increments smaller, perhaps one or two degrees rather than five degrees.

The foregoing assumed that the observance of chart recordings and calculations were done manually. It is, however, possible to do this automatically by a simple computer or comparator 60 and print-out 62 shown in FIG. 2. The computer determines the transmitting antenna angle for maximum signal strength of the pulses 58 in FIG. 5B. Thereafter, it computes from this angle and the known distance between the antennas the height of the upper limit of the inversion layer and prints the result via print-out 62.

Although the invention has been shown in connection with certain specific embodiments and examples, it will be readily apparent to those skilled in the art that various changes can be made to suit requirements without departing from the spirit and scope of the invention.

We claim as our invention:

1. In the method of determining the height of an atmospheric temperature inversion, the steps of radiating a beam of electromagnetic wave energy upwardly from a point adjacent the surface of the earth and causing said beam of wave energy to be radiated at a frequency at which it will be at least partially reflected from the interface between a lower cooler air mass and an upper warmer air mass, and detecting at a point adjacent the earth's surface which is spaced from said first-mentioned point the beam of radiation reflected from said interface and its angle of incidence with respect to the earth, whereby the height of said interface can be calculated from a consideration of the distance between said points and the angle of incidence of said reflected beam.

2. The method of claim 1 wherein said electromagnetic wave energy is radiated at a frequency in the range of 2,000 to 3,000 megahertz.

3. The method of claim 1 wherein said electromagnetic wave energy is radiated at a frequency of about 2,300 megahertz.

4. The method of claim 1 including the step of electrically calculating the height of said interface above the earth's surface from a consideration of the distance between said points and said angle of incidence.

5. The method of claim 1 wherein said beam of radiation is transmitted and received by directional transmitting and receiving antennas, and including the steps of positioning said transmitting antenna at different angular positions facing upwardly toward said interface such that a beam of radiation transmitted therefrom will be at least partially reflected back from said interface toward the receiving antenna, and causing said receiving antenna to scan through an arc within which it can detect a reflected beam each time the transmitting antenna is positioned at a different angular position.

6. The method of claim 5 wherein said antennas are adapted to scan through an essentially common plane which is essentially normal to said interface.

7. The method of claim 5 wherein said transmitting antenna is moved through 90° in successive increments to position it at said different angular positions and said receiving antenna is caused to scan through an arc of 90° each time the transmitting antenna is positioned at a different one of said angular positions.

8. The method of claim 7 wherein said 90° scans of the transmitting and receiving antennas have lower limits where the axes of said directional antennas are horizontal and upper limits where said axes are vertical.

9. The method of claim 5 wherein said steps are repeated without and with a temperature inversion present above said antennas, and comparing the returns received by said receiving antenna with and without an inversion present to determine the existence of the inversion.

10. Apparatus for determining the existence of an atmospheric temperature inversion comprising transmitting and receiving directional antennas positioned at spaced points on the ground surface at essentially the same elevation above sea level, means for causing said transmitting antenna to move in increments through an arc of essentially 90° from a position where its axis is horizontal and its beam is radiated toward the receiving antenna to a position where its axis is vertical, means for causing said receiving antenna to scan through an arc of essentially 90° from a position where its axis is horizontal and intersects the position of said transmitting antenna to a position where its axis is vertical, the transmitting antenna being stopped each time it scans through an increment and the receiving antenna scanning through a complete 90° arc each time the transmitting antenna is stopped, and means coupled to said receiving antenna for detecting wave energy transmitted from said transmitting antenna and reflected from the uppermost limit of the temperature inversion to said receiving antenna, whereby the existence of said temperature inversion can be determined.

11. The apparatus of claim 10 including means for producing an electrical signal indicative of the angular position of said receiving antenna, and means responsive to said signal and the detected wave energy for determining the existence of a temperature inversion.

12. The apparatus of claim 10 including a chart recorder for continually recording the amplitude of the detected radiation and the position of said receiving antenna whereby increases in amplitude in the detected radiation can be correlated with the positions of the receiving antenna at which those increases in amplitude occur.

* * * * *